J. H. GIBSON & H. L. WHITMAN.
TRANSMISSION GEAR.
APPLICATION FILED MAY 25, 1908.
996,920.
Patented July 4, 1911.
3 SHEETS—SHEET 2.
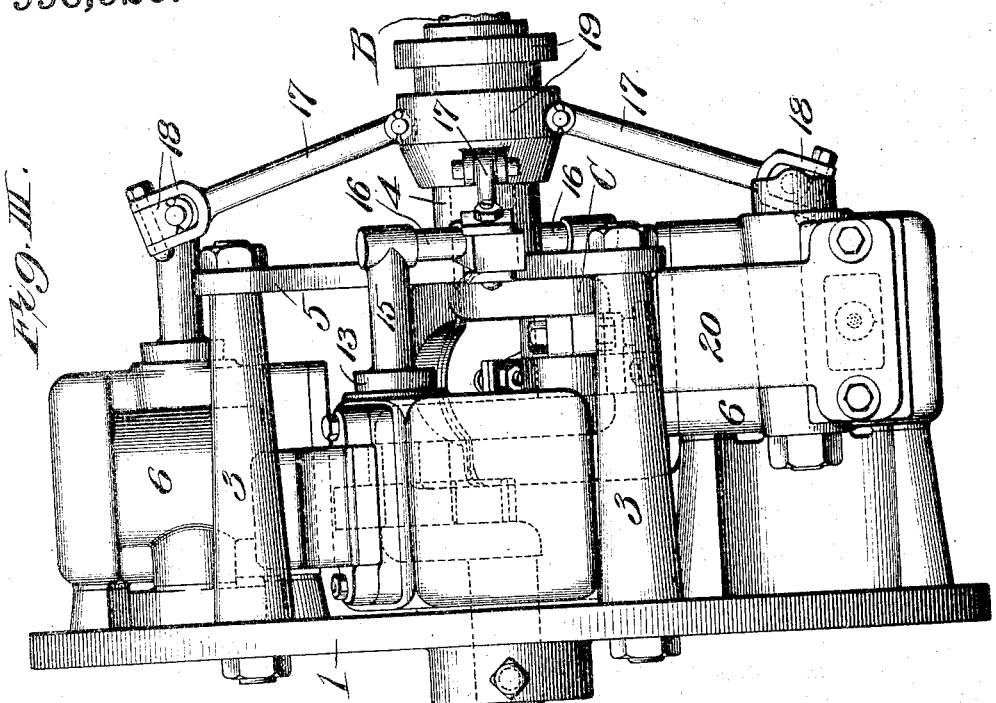
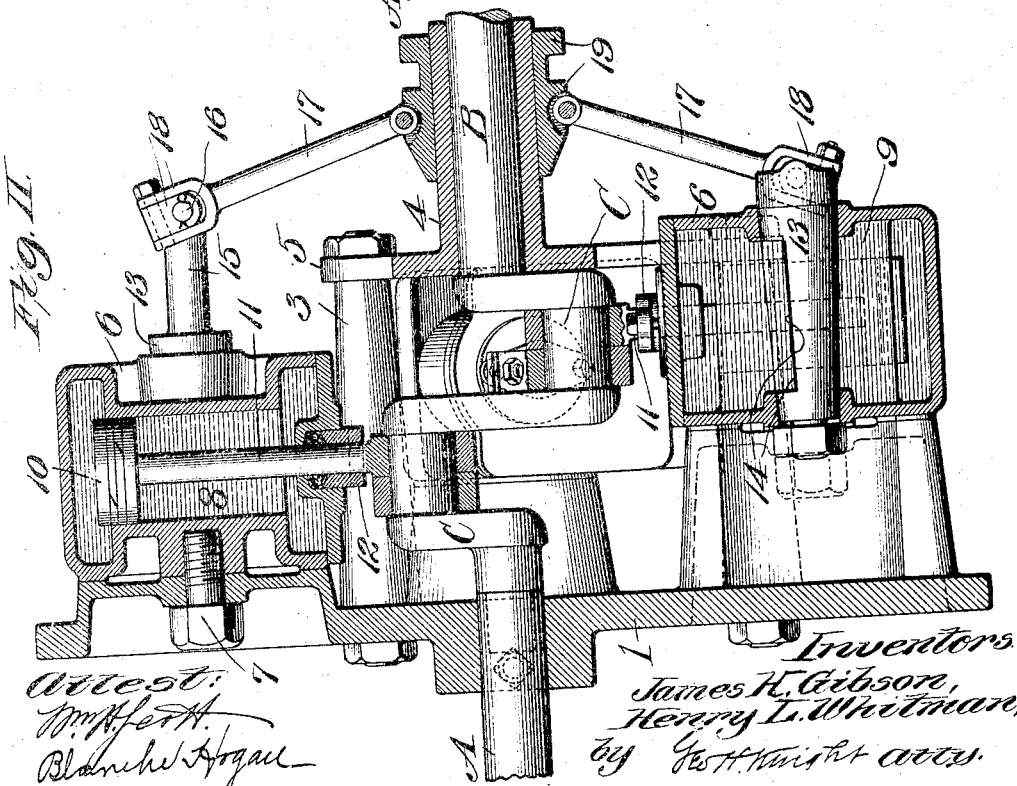

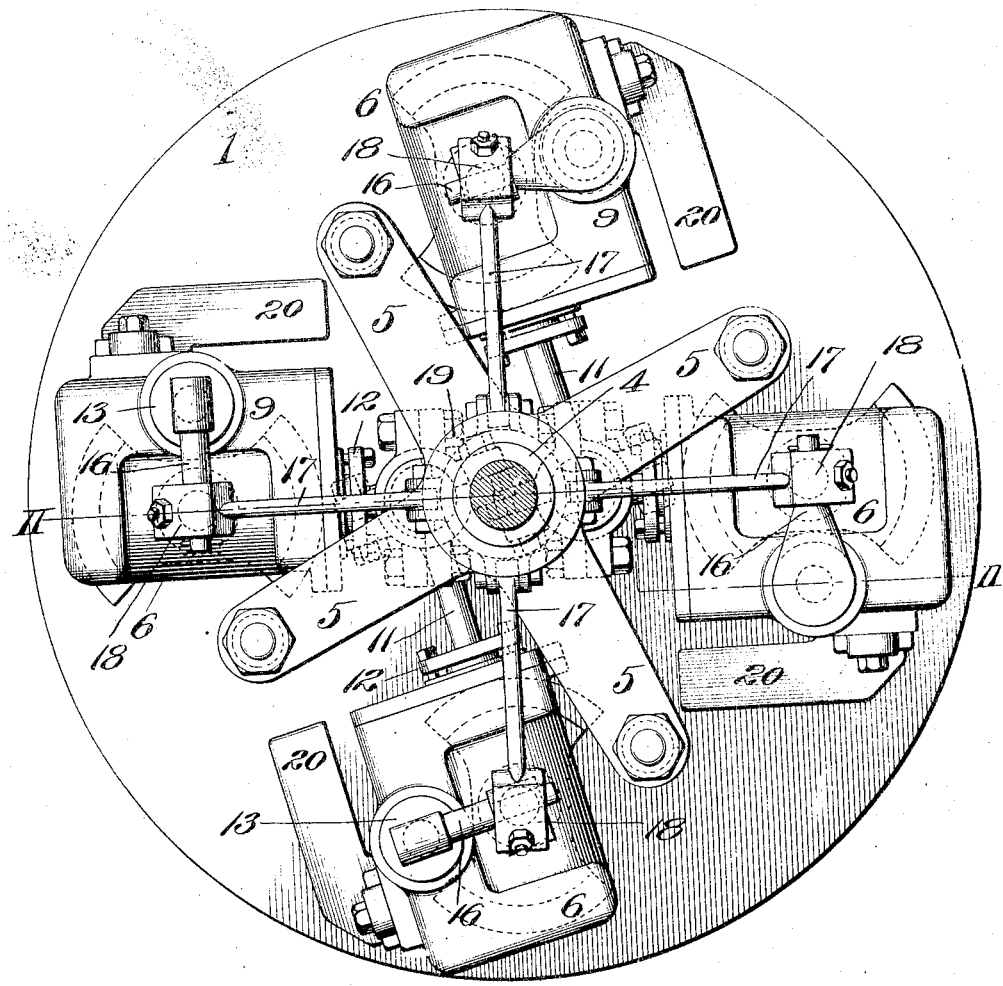

J. H. GIBSON & H. L. WHITMAN.
TRANSMISSION GEAR.
APPLICATION FILED MAY 25, 1908.
996,920.
Patented July 4, 1911.
3 SHEETS—SHEET 3.
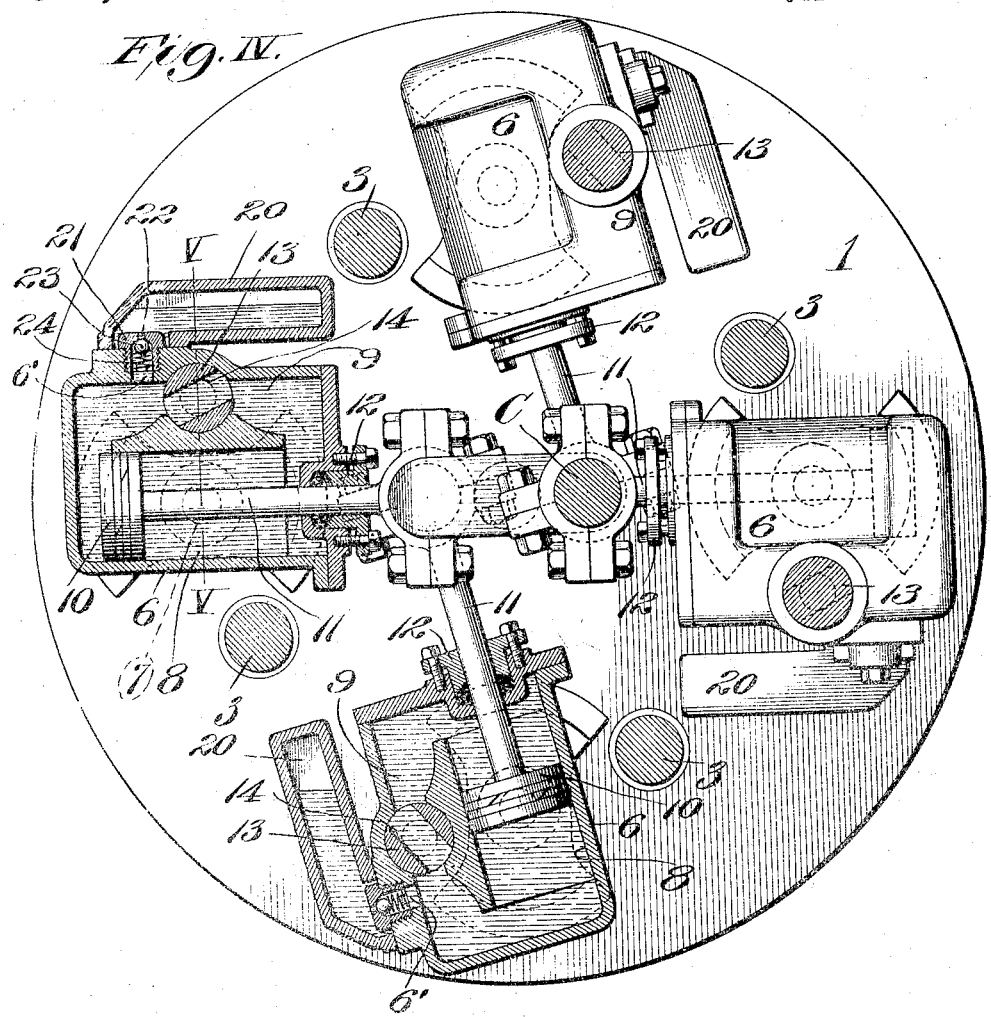
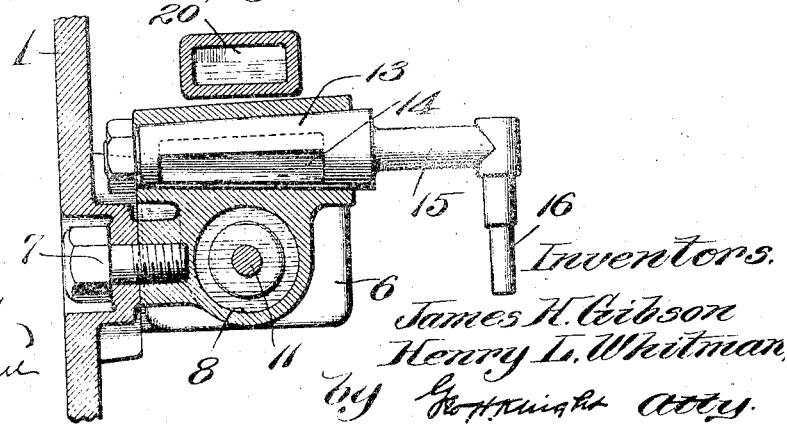

UNITED STATES PATENT OFFICE.

JAMES H. GIBSON AND HENRY L. WHITMAN, OF ST. LOUIS, MISSOURI.

TRANSMISSION-GEAR.

996,920.

Specification of Letters Patent.   Patented July 4, 1911.

Application filed May 25, 1908. Serial No. 434,752.

*To all whom it may concern:*

Be it known that we, JAMES H. GIBSON and HENRY L. WHITMAN, citizens of the United States of America, residing at the city of St. Louis, in the State of Missouri, have invented certain new and useful Improvements in Transmission-Gears, of which the following is a full, clear, and exact description, reference being had to the accompanying drawing, forming part of this specification.

Our invention relates to a hydraulically controlled transmission gear by which the speed of a secondary shaft may be efficiently governed when motion is transmitted thereto from a primary shaft, in order that the secondary shaft may be operated at a speed corresponding to that of the primary shaft and at varying speeds less than that of the primary shaft.

Figure I is an end elevation of our transmission gear. Fig. II is a cross section of the transmission gear taken on irregular line II—II Fig. I. Fig. III is a side elevation of the transmission gear. Fig. IV is in part an end elevation and in part a vertical cross section. Fig. V is a cross section taken on line V—V, Fig. IV.

In the accompanying drawings: A designates a primary shaft to which power may be communicated in any desired manner and B is a secondary shaft that is adapted to be driven by power communicated from the primary shaft through our transmission gear. The secondary shaft is provided with any desirable number of cranks C and the end thereof which opposes the primary shaft is preferably stepped into said primary shaft, as seen in dotted lines Fig. II.

1 designates a disk or carrier mounted upon the primary shaft A and fixedly secured thereto by any suitable means. This carrier is therefore adapted to rotate continually with the primary shaft when said shaft is in motion.

3 are supporting arms carried by the carrier and which are preferably of sufficient length to extend to or beyond the crank C of the secondary shaft that is farthest removed from the carrier 1.

4 is a supporting sleeve that loosely surrounds the secondary shaft B and is provided with radial arms 5 that are connected to the supporting arms 3, thus providing for the partial inclosure of the cranks of the secondary shaft between the carrier 1 and the radial arms 5 of the sleeve 4.

6 designates a plurality of fluid holding cylinders that are oscillatorily connected at one side to the carrier 1 intermediate of their ends by suitable means, such as pivot screws 7 that pass through the carrier and are seated in sockets in the cylinder, as seen most clearly in Figs. II and V. Each cylinder has located wholly within it a piston way 8 extending longitudinally of the cylinder and spaced apart from a portion of the longitudinal wall of the cylinder to provide a by-pass 9 in the cylinder alongside the pistonway. The piston-ways are open at their ends facing the ends of the cylinders and said ends of the piston-ways are sufficiently spaced from the cylinder ends to provide free communication between each end of each piston-way and the adjoining by-pass 9. It will be appreciated that this construction provides for delivery of fluid from either end of a piston-way into a by-pass and through the by-pass to the opposite ends of the cylinder and piston-way.

In the piston way of each cylinder 6 is a piston 10 that is carried by a piston rod 11 that extends through a stuffing box 12 at the inner end of the cylinder. We prefer to utilize four of the cylinders 6 and the parts companionable therewith, and have shown this number in the drawings, although we do not limit ourselves to any particular number of such parts. The piston rods 11 are loosely fitted at their ends, which are exterior of the cylinders, to cranks of the secondary shaft B and in the drawings we have illustrated two of such cranks with two of the piston rods connected to one of the cranks, and the other two piston rods connected to the other crank.

13 designates valves that are mounted in the cylinders 6 and which extend across the by-passes 9 therein to serve as means for controlling the flow of fluid through said by-passes. Each of these valves is provided with a transverse port 14. The valves 13 are preferably plug valves and each valve is provided exteriorly of the cylinder in which it is mounted with a stem 15 (see Figs. II, III and V) from which extends a transverse arm 16, see Figs. I and V. The valves may be operated by any suitable means, but we prefer to employ the mechanism shown in the drawings which consists of links 17 connected to the transverse arms of the valves by universal couplings 18 and a shift sleeve 19 to which the inner ends of said links are pivoted. The shift sleeve 19 is loosely mounted upon the sleeve 4 around the secondary shaft, and it will be readily perceived that when the shift sleeve is moved forwardly and backwardly upon said sleeve, either a thrust or a pull will be imparted to the links 17 and that as a consequence the several valves 13 will be rotated in their seats in the cylinders 6 with the result of changing the positions of the ports 14 in the valves that are adapted to register with the by-passes in the cylinders.

In the practical use of our transmission gear, the operation is as follows: When it is desired to cause the primary shaft A to drive the secondary shaft B at a speed corresponding to that of said primary shaft, the valves 13 in the cylinders 6 are so moved that they will close the by-passes 9 in the cylinders in order that fluid may not circulate through the by-passes from either end of either cylinder to its other end. The pistons in the cylinders will then be confined between a body of fluid at each of their sides and will not be susceptible of moving in the cylinders. It will be seen therefore that during the rotation of the carrier 1 with the primary shaft and consequent rotation of the cylinders 6, said cyinders, the pistons therein and their piston rods will act positively upon the cranks of the secondary shaft to drive said secondary shaft at a speed corresponding to that of the primary shaft. Now, when it is desired to impart a speed to the secondary shaft of a degree less than that at which the primary shaft is driven, the valves 13 are opened to permit flow of fluid through the by-passes in the cylinders 6, the degree to which the valves are opened being determined by the amount of flow of fluid it may be desired to permit passage of through the by passes 9 and the consequent reduction of speed of the secondary shaft as compared with the speed of the primary shaft. To illustrate: If it is desired to cause the secondary shaft to be driven at only a slightly decreased speed relative to the primary shaft, the valves would only be opened to a slight degree with the result of permitting only a small flow of fluid through each by-pass and valve, thus permitting a restricted movement of each of the pistons in the cylinders, due to the restricted circulation of fluid from one end of each cylinder to the other end of each cylinder, and consequently causing the piston rods to play in a limited degree so that they will not act upon the cranks of the secondary shaft to drive said secondary shaft at a speed equal to that of the primary shaft. To further decrease the speed of the secondary shaft, it is only necessary to open the valves to a requisite degree in order that any desired diminished speed may be occasioned, due to more freedom of movement of the pistons in the cylinders being permitted. It will be readily understood that the opening of the valves may be continued until there is an unrestrained flow of fluid through the by-passes at which time the pistons will play idly in the cylinders and become inactive upon the secondary shaft.

In view of possible occurrence of leakage of fluid from the cylinders 6, we provide automatic fillers for the cylinders adapted to contain a supply of fluid that may be admitted to the cylinders to compensate for any deficiency of fluid therein. In a wall of each cylinder 6 is an opening 6'. 20 is a reservoir suitably secured to each cylinder at the location of the opening 6' therein and from which fluid may flow through said opening into the cylinder. The opening 6' is controlled by a valve housing 21 that is seated in the opening and provided with a port 22. The port 22 is controlled by a suitable check valve 23, located within the valve housing and held to a seat around said port by a spring 24. In the event of a deficiency of fluid occurring in either cylinder, the check valve 23 opens inwardly and a sufficient amount of fluid passes from the filler reservoir into the cylinder to supply the deficiency, after which said check valve closes and remains in a closed condition until a deficiency of fluid in the cylinder again occurs. It should be stated that in the event of a deficiency of fluid occurring in either cylinder, the check valve is caused to open due to force of fluid thereagainst in order that the desired flow of fluid may take place from the filler as it were, to the cylinder.

We have, in this description of our transmission gear referred to the shaft A as a primary shaft and said shaft may also be properly termed a driving shaft. We have further referred to the shaft B as a secondary shaft, and this shaft may also be properly termed a driven shaft.

A statement should now be made that instead of the shaft A serving as a driving shaft and the shaft B as a driven shaft, the operation of the parts may be reversed and the shaft B be utilized as the driving shaft to transmit power to the shaft A considered as a driven shaft.

In view of the statement just made we desire it to be understood that we do not limit ourselves to the operation of the gear in the manner hereinbefore described in detail.

We claim:

1. In a transmission gear, the combination of a pair of shafts, one of which is provided with a plurality of cranks, a carrier fixed to the other shaft, fluid holding cylinders each carried intermediate of its ends by said carrier and each containing a piston-way and a by-pass located wholly within the cylinder, pistons operable in said piston-ways, piston rods connected in pairs to said pistons and said cranks, and valves located in said by-passes and adapted to govern the flow of fluid therethrough to control the action of said pistons and piston rods, substantially as set forth.

2. In a transmission gear, the combination of a pair of shafts, one of which is provided with a plurality of cranks, and a plurality of fluid controlled means, each carried intermediate of its ends by the other shaft and each having a piston way and by-pass located wholly therein, and pistons in the piston ways having piston rods connected in pairs with said cranks.

3. The combination with a primary shaft, a secondary shaft having cranks, a supporting sleeve in which the secondary shaft is loosely mounted, fluid holding cylinders each having a piston way and a by-pass, pistons in the piston ways having rods connected with the cranks, the valves, formed with ports, connecting the opposite ends of the by-passes and provided with transverse arms, a shift sleeve mounted on the supporting sleeve, and the links connecting the shift sleeve with the transverse arms of the valves.

4. The combination of a fluid holding cylinder for transmitting gear constructed with a piston-way, a by-pass at one side of the piston-way, a wall opening, a controlling plug valve, extending across the by-pass, and formed with a port connecting the opposite ends of the by-pass, a spring valve within the wall opening, and a reservoir supported on the cylinder and in communication with the wall opening.

5. The combination of a primary shaft, a carrier having supporting arms and fixedly secured to the primary shaft, a secondary shaft having cranks located between the supporting arms, a supporting sleeve in which the secondary shaft is loosely mounted, having radial arms connected to the supporting arms, fluid holding cylinders pivoted at their sides to the carrier and each having a piston-way spaced from the ends of the cylinder and a by-pass at one side of the piston-way, pistons in the piston-ways having rods connected with the cranks, the valves extending across the by-passes, formed with ports connecting the opposite ends of the by-passes and provided with transverse arms, a shift sleeve mounted on the supporting sleeve, and the links connecting the shift sleeve with the transverse arms of the valves.

6. The combination of a primary shaft, a carrier having supporting arms and fixedly secured to the primary shaft, a secondary shaft having cranks located between the supporting arms, a supporting sleeve in which the secondary shaft is loosely mounted, having radial arms connected to the supporting arms, fluid holding cylinders pivoted at their sides to the carrier, and each having a piston-way spaced from the ends of the cylinder, a by-pass at one side of the piston-way, a wall opening, a spring valve within the wall opening, and a reservoir supported on and in communication with the wall opening, pistons in the piston-ways, having rods connected with the cranks, the valves extending across the by-passes, formed with ports connecting the opposite ends of the by-passes and provided with transverse arms, a shift sleeve mounted upon the supporting sleeve, and the links connecting the shift sleeve with the transverse arms of the valves.

JAS. H. GIBSON.
HENRY L. WHITMAN.

In the presence of—
H. G. COOK,
BLANCHE HOGAN.